(12) United States Patent
Wu et al.

(10) Patent No.: US 11,340,805 B1
(45) Date of Patent: May 24, 2022

(54) GREEDY PACKING ALGORITHM WITH CACHING AND RANKING

(71) Applicant: EMC IP HOLDING COMPANY LLC, Hopkinton, MA (US)

(72) Inventors: Peng Wu, Westborough, MA (US); Rong Yu, West Roxbury, MA (US); Jingtong Liu, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 25 days.

(21) Appl. No.: 17/157,204

(22) Filed: Jan. 25, 2021

(51) Int. Cl.
*G06F 3/06* (2006.01)

(52) U.S. Cl.
CPC ............ *G06F 3/0631* (2013.01); *G06F 3/061* (2013.01); *G06F 3/067* (2013.01); *G06F 3/0656* (2013.01)

(58) Field of Classification Search
CPC ........ G06F 3/061; G06F 3/0631; G06F 3/067; G06F 3/0656

USPC ............................................................ 711/4
See application file for complete search history.

(56) References Cited

U.S. PATENT DOCUMENTS

| 9,600,200 | B1 * | 3/2017 | Wallace | G06F 12/0868 |
| 11,256,447 | B1 * | 2/2022 | Pang | G06F 3/0659 |
| 2021/0387262 | A1 * | 12/2021 | Catana Salazar | B29C 64/393 |

* cited by examiner

*Primary Examiner* — Than Nguyen
(74) *Attorney, Agent, or Firm* — Anderson Gorecki LLP

(57) ABSTRACT

A storage array packs multiple non-full-size front-end tracks into slices that contain multiple back-end tracks. A greedy first fit packing algorithm is used to find packing solutions that are cached and ranked. The cached, ranked packing solutions are used by attempting to find matches with bucketed front-end tracks to be relocated. New packing solutions are generated and cached when matches cannot be found. Packing solutions may be shared outside the domain in which they are discovered.

20 Claims, 8 Drawing Sheets

FE TRKs To Be Relocated
360

Bucketed FE TRKs To Be Relocated
362

US 11,340,805 B1

GREEDY PACKING ALGORITHM WITH CACHING AND RANKING

TECHNICAL FIELD

The subject matter of this disclosure is generally related to electronic data storage systems, and more particularly to data packing in such systems.

BACKGROUND

High-capacity data storage systems such as storage area networks (SANs) are used to maintain large data sets and contemporaneously support multiple users. A SAN includes a network of interconnected compute nodes that manage access to data stored on arrays of drives. The compute nodes respond to input-output (IO) commands from host applications running on servers known as "hosts." Examples of host applications may include, but are not limited to, software for email, accounting, manufacturing, inventory control, and a wide variety of other business processes. The SAN compute nodes lack metadata that describes high-level data structures such as files in the host application data. SANs are based on a block architecture that presents logical storage volumes with contiguous logical block addresses (LBAs) to the hosts. A host references LBAs to access data allocation units known as front-end tracks (FE TRKs) that are maintained by the SAN on a logical volume of storage. The SAN maintains metadata that maps between the LBAs of FE TRKs and back-end tracks (BE TRKs) on the managed drives.

In order for the SAN metadata to be practical and efficient to manage, a single fixed size is used for the BE TRKs and the compute nodes access data from the managed drives in units of BE TRKs. For example, and without limitation, BE TRKs of a storage system may all have the same fixed size as fixed block architecture (FBA) FE TRKs. BE TRKs and FE TRKs should not be confused with the hard disk drive (HDD) tracks that characterize spinning disk storage architecture. An HDD track corresponds to a concentric band on a platter. A sector, which is the smallest unit of storage that an HDD can process, is a portion of one of those concentric bands, e.g., 1 track may have 32 sectors. BE TRKs are usually larger in size than HDD tracks and are not limited by the physical architecture of a spinning platter. The BE TRK size for a SAN is selected as a design choice and is generally proportional to the manageability of the metadata, but inversely proportional to resource utilization efficiency. Using larger capacity BE TRKs can reduce the resource burden on memory and processing resources for metadata management but decreases the efficiency of managed drive utilization by creating more unused space in BE TRKs.

FE TRKs can vary in size. For example, a FE TRK of data that has the same size as a BE TRK will usually have a smaller size when compressed. Further, variable size FE TRKs are known. Consequently, it may be desirable to pack multiple FE TRKs into individual BE TRKs.

SUMMARY

All examples, aspects and features mentioned in this document can be combined in any technically possible way.

In accordance with some implementations a method comprises: in a data storage system comprising a plurality of non-volatile drives and a plurality of interconnected compute nodes that access the drives: the compute nodes presenting at least one logical production volume to hosts and managing access to the drives, wherein the hosts access the production volume using front-end tracks as allocation units, the compute nodes access the drives using back-end tracks as allocation units, and the drives are organized into same-size slices that are protection group members; the compute nodes packing front-end tracks into ones of the slices by: sorting the front-end tracks into buckets based on size; matching cached packing solutions with a subset of the sorted front-end tracks; and packing the subset of the sorted front-end tracks that match one of the cached packing solutions into a selected one of the slices.

In accordance with some implementations an apparatus comprises: a data storage system comprising: a plurality of non-volatile drives; and a plurality of interconnected compute nodes that present at least one logical production volume to hosts and manage access to the drives, wherein the hosts access the production volume using front-end tracks as allocation units and the compute nodes access the drives using back-end tracks as allocation units and the compute nodes packing front-end tracks into ones of the slices by: sorting the front-end tracks into buckets based on size; matching cached packing solutions with a subset of the sorted front-end tracks; and packing the subset of the sorted front-end tracks that match one of the cached packing solutions into a selected one of the slices.

In accordance with some implementations a computer-readable storage medium stores instructions that when executed by a computer cause the computer to perform a method for data packing, the method comprising: compute nodes presenting at least one logical production volume to hosts, wherein the hosts access the production volume using front-end tracks as allocation units and the compute nodes access the drives using back-end tracks as allocation units; and the compute nodes packing multiple front-end tracks into slices containing a plurality of back-end tracks by: sorting the front-end tracks into buckets based on size; matching cached packing solutions with a subset of the sorted front-end tracks; and packing the subset of the sorted front-end tracks that match one of the cached packing solutions into a selected one of the slices.

DETAILED DESCRIPTION

The terminology used in this disclosure is intended to be interpreted broadly within the limits of subject matter eligibility. The terms "drive" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
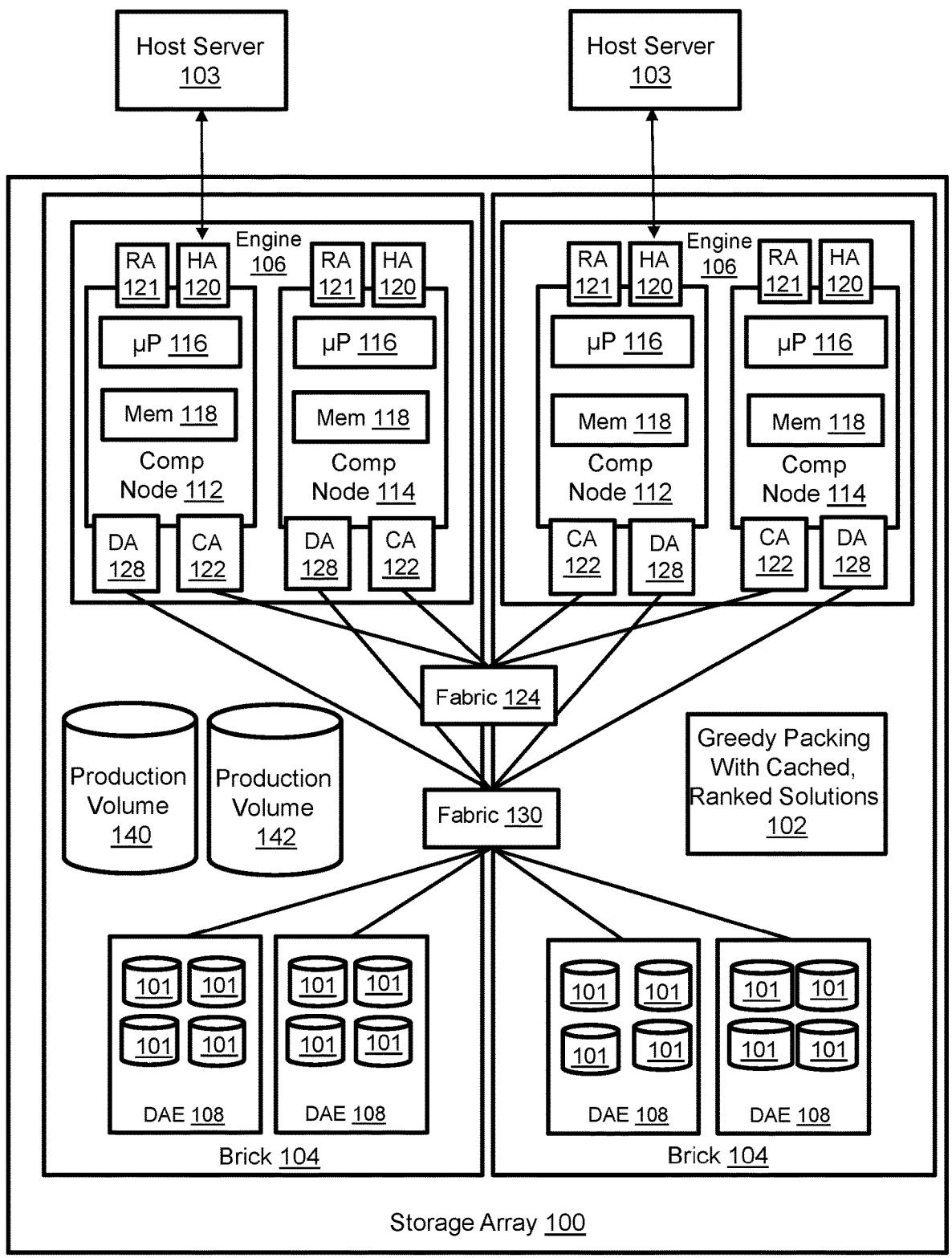
FIG. 1 illustrates a storage array that implements greedy first fit packing with caching and ranking of packing solutions.

FIG. 1 illustrates a storage array 100 that implements packing with cached, ranked packing solutions 102. The storage array 100 is one example of a storage area network (SAN). The storage array 100 is depicted in a simplified data center environment supporting two host servers 103 that run host applications. There would typically be many more host servers. The host servers 103 may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard drive drives (HDDs) with spinning drive magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts but the storage array creates logical storage devices referred to herein as production volumes 140, 142 that can be discovered and accessed by the hosts. Without limitation, a production volume may be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous logical block addresses (LBAs) at which FE TRKs of data used by the instances of the host application reside. However, the host application data is stored at non-contiguous addresses on various managed drives 101, e.g., at ranges of addresses distributed on multiple drives or multiple ranges of addresses on one drive. The compute nodes maintain metadata that maps between the production volumes 140, 142 and the managed drives 101 in order to process IO commands from the hosts.

Figure 2:
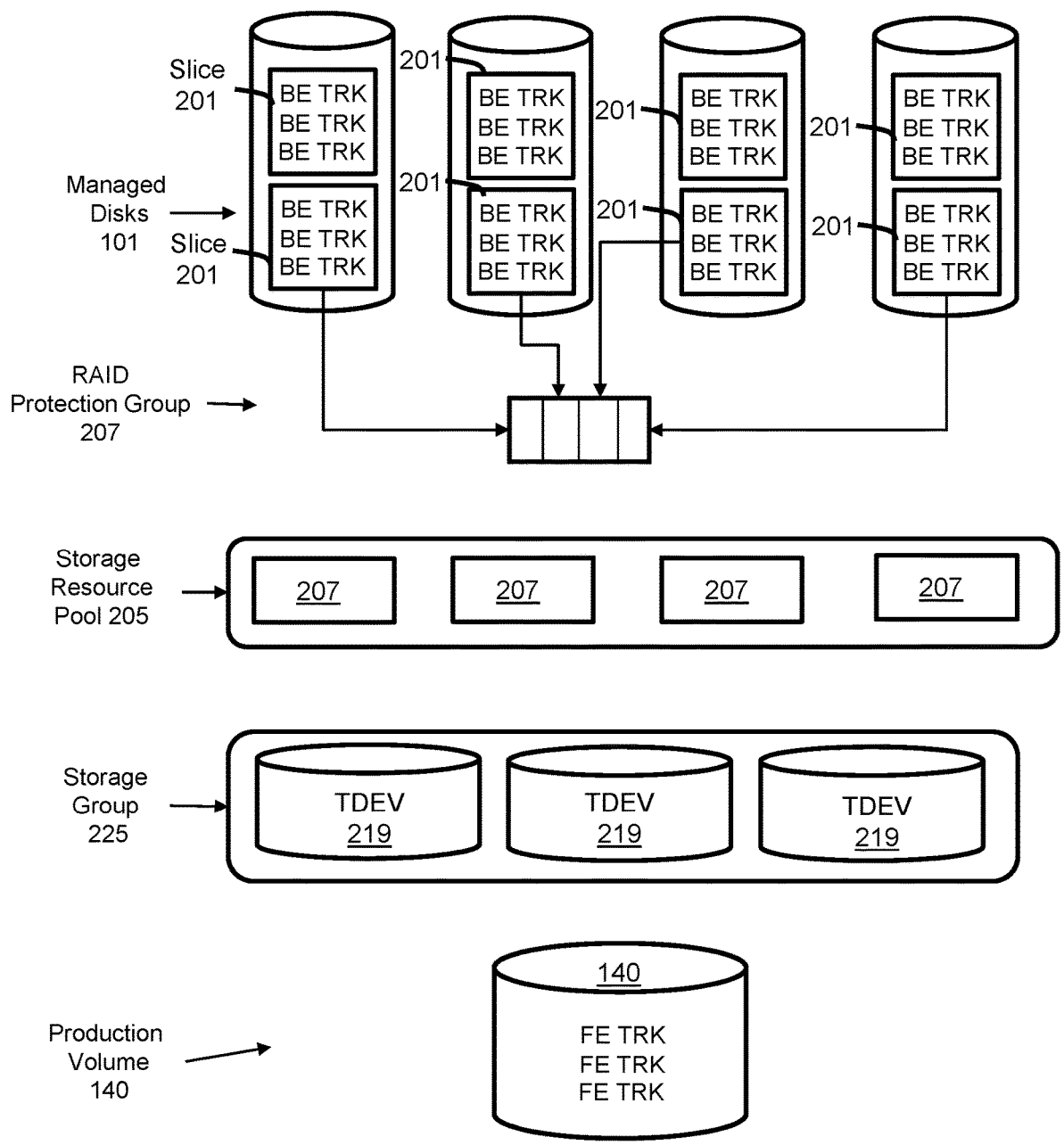
FIG. 2 illustrates layers of abstraction between the managed drives and the production volumes of the storage array of FIG. 1.

FIG. 2 illustrates layers of abstraction between the managed drives 101 and the production volume 140. The basic allocation unit of storage capacity that is used by the compute nodes to access the managed drives 101 is a back-end track (BE TRK). BE TRKs all have the same fixed size which may be an integer (greater than 1) multiple of the managed drive sector size. The managed drives 101 are each organized into slices 201 of equal storage capacity, i.e., every slice has the same fixed size. Each slice 201 is large enough to accommodate multiple BE TRKs. For example, and without limitation, slices might be 512 KB and BE TRKs might be 128 KB. Selection of slice size is a design implementation and, for context and without limitation, may be some fraction or percentage of the capacity of a managed drive equal to an integer multiple of the sector size. Each slice may include a contiguous range of logical addresses. A group of slices from different managed drives is used to create a RAID protection group 207. In other words, the slices are protection group members and, in order to be RAID-compliant, each slice in a protection group must be on a different managed drive. In some implementations all of the managed drives associated with a RAID protection group have the same storage capacity. A storage resource pool 205 is a collection of RAID protection groups 207 of the same type, e.g., RAID-5 (3+1). Logical thin devices (TDEVs) 219 are created from a storage resource pool and organized into a storage group 225. The production volume 140 is created from one or more storage groups. The storage array may create and maintain multiple production volumes.

Some FE TRKs may be stored as compressed data, so they are not full-size in the compressed form and require less than a full BE TRK. Even uncompressed FE TRKs do not necessarily have a single fixed size and may require less than a full BE TRK. On a production volume with a fixed-block architecture (FBA) all the FBA FE TRKs have the same uncompressed size, which may be the same as the BE TRK size, but the compressed sizes depend on data compressibility. On a production volume with a variable-block architecture the uncompressed FE TRKs exist in a variety of sizes. For example, a count key data (CKD) track includes data blocks that can vary in length, up to a limit. Variable size FE TRKs can create wasted space when one BE TRK is used to store one smaller FE TRK. Compressed FE TRKs can also create wasted space due to inefficient packing. As will be explained below, non-full-size FE TRKs such as compressed FE TRKs and variable size FE TRKs can be packed into slices using greedy first fit packing with cached, ranked solutions to improve utilization efficiency of storage resources. Slices are used as the domain for FE TRK packing because slices are RAID protection group members so distributing a FE TRK across multiple slices would potentially violate RAID constraints. Limitations associated with metadata management may impose an upper limit on the number of FE TRKs that can be packed into a slice.

Figure 3A:
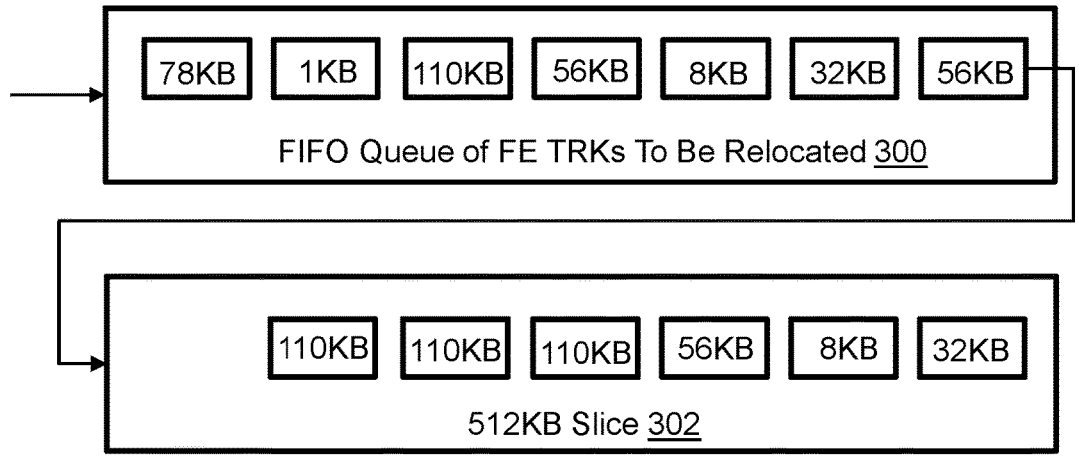
FIGS. 3A and 3B illustrate packing of FE TRKs into a slice using a basic packing algorithm.
Figure 3B:
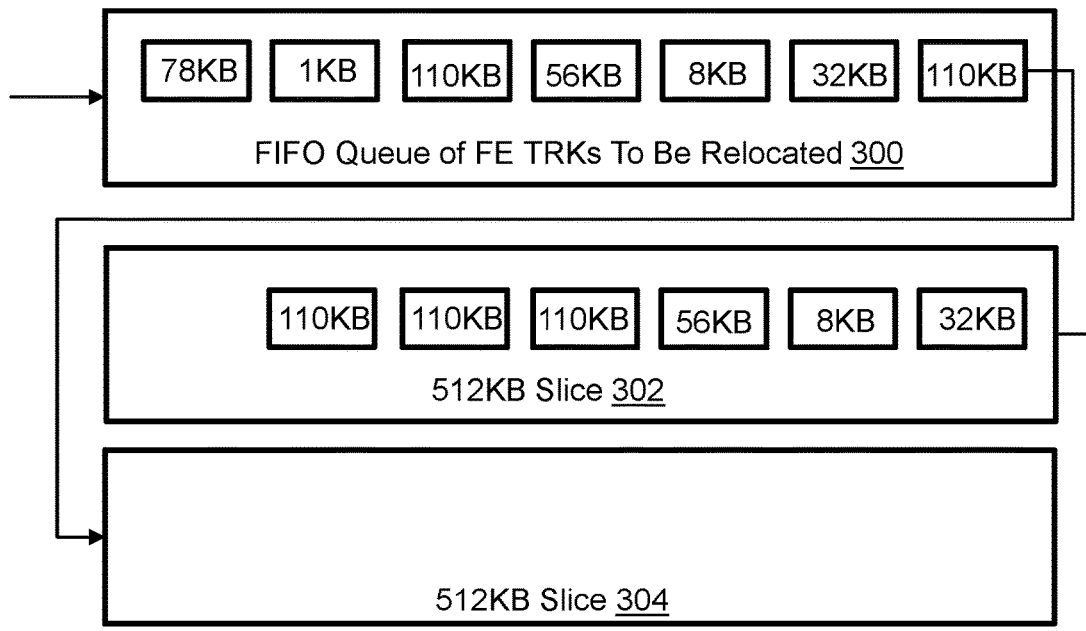

FIGS. 3A and 3B illustrate packing of non-full-size FE TRKs into slices using a basic packing algorithm. Packing may be prompted by relocation of FE TRKs, e.g., to a new storage resource pool. The FE TRKs to be relocated are enqueued in a FIFO queue 300 represented by a single linked list data structure. The enqueued FE TRKs include a variety of different sizes due to variations in compressibility or variable size. The sizes and order of occurrence within the queue may be random. The basic packing algorithm selects the oldest FE TRK in the FIFO queue and determines whether a currently selected slice 302 being packed has sufficient remaining free space to accommodate the selected FE TRK. As shown in FIG. 3A, if the currently selected slice 302 has sufficient remaining free space to accommodate the selected 56 KB FE TRK then the selected FE TRK is placed in the currently selected slice 302. The next FE TRK (32 KB FE TRK) in the queue is then selected and the process is repeated. As shown in FIG. 3B, if the currently selected slice 302 does not have sufficient remaining free space to accommodate the selected 110 KB FE TRK then the currently selected slice 302 is considered packed and the selected 110 KB FE TRK is placed in a new empty slice 304 that becomes the currently selected slice. The packed slice 302 is not further packed with more FE TRKs. The basic packing algorithm is computationally efficient but average packing efficiency is not as good as more computationally intensive algorithms.

Figure 4:
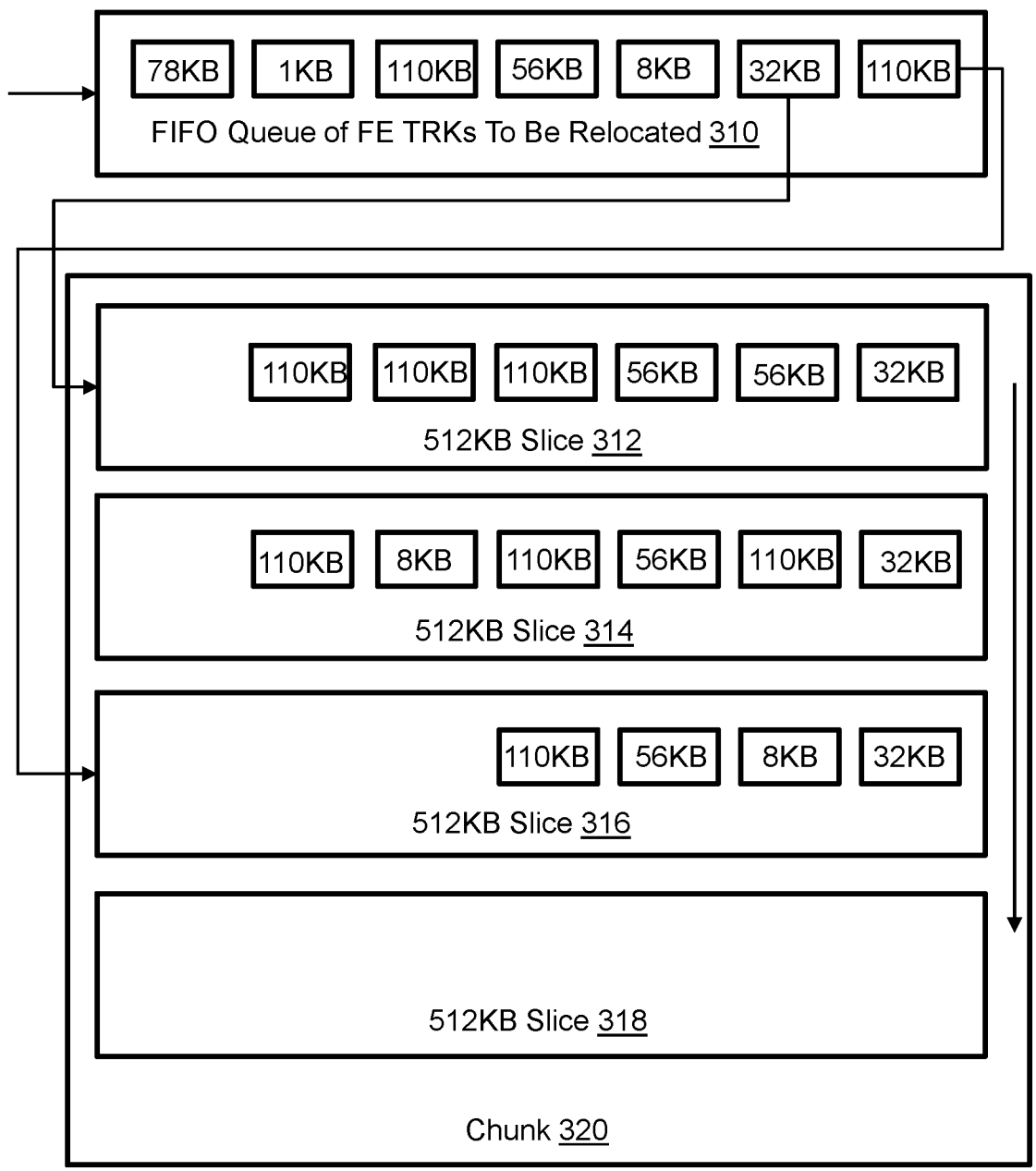
FIG. 4 illustrates packing of FE TRKs into a slice using a greedy first fit packing algorithm.

FIG. 4 illustrates packing of non-full-size FE TRKs using a greedy first fit packing algorithm. The FE TRKs to be relocated are enqueued in a FIFO queue 310 represented by a single linked list data structure. A set of slices 312, 314, 316, 318 in a chunk 320 are ordered candidates to accommodate the enqueued FE TRKs. The candidate slices are considered in a predetermined order, e.g., BE slice 312 first, then BE slice 314, the BE slice 316, then BE slice 318. The greedy first fit packing algorithm selects the oldest FE TRK in the FIFO queue and determines whether the currently considered slice in the order has sufficient remaining free space to accommodate the selected FE TRK. For example, the 110 KB FE TRK in the illustrated example is determined to be too large to fit into slice 312, then determined to be too large to fit into slice 314, and then determined to fit into slice 316. The 110 KB FE TRK is therefore packed in slice 316. The 32 KB FE TRK that is selected next is determined to fit into slice 312 so none of the other slices are considered. The greedy first fit packing algorithm is characterized by selecting the first candidate slice within the order that will accommodate the FE TRK.

Figure 5:
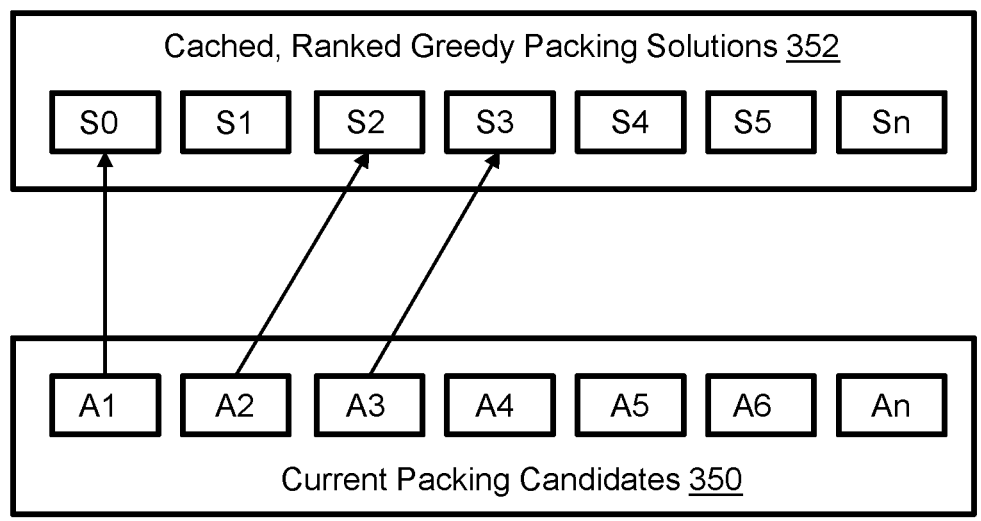
FIG. 5 illustrates matching of current packing candidates to cached, ranked packing solutions.

FIG. 5 illustrates matching of current packing candidates 350 to cached, ranked greedy first fit packing solutions 352. At least some of the combinations of FE TRK sizes packed in slices as a result of running the greedy first fit packing algorithm are cached as known historical packing solutions. For example, one packing solution S0 for a 512 KB slice may be three 110 KB FE TRKs, two 56 KB FE TRKs, and two 32 KB FE TRKs. Sets of non-full-size FE TRKs to be relocated are considered as current packing candidates for cached packing solutions. The current packing candidates are matched (if possible) with the cached, ranked greedy first fit packing solutions. In the illustrated example current packing candidate A1 matches solution S0, current packing candidate A2 matches solution S2, and current packing candidate A3 matches solution S3. The cached packing solutions are ranked in order based on the number of times the solution is used for packing a slice. For example, S0 has been used more times than 51. Matching may be performed by making comparisons in ranked order from the most used solution S0 to the least used solution Sn. When a match is found, the matching packing solution is used for the current packing candidate, which is advantageous because the greedy first fit packing algorithm is not required to be re-run to achieve that packing solution for the current packing candidate.

Figure 6:
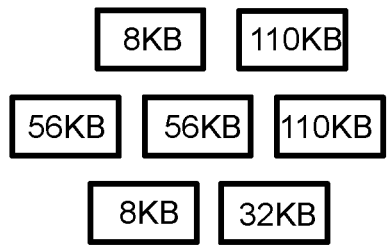
FIG. 6 illustrates preprocessing to facilitate matching of current packing candidates to cached, ranked packing solutions.
Figure 6:
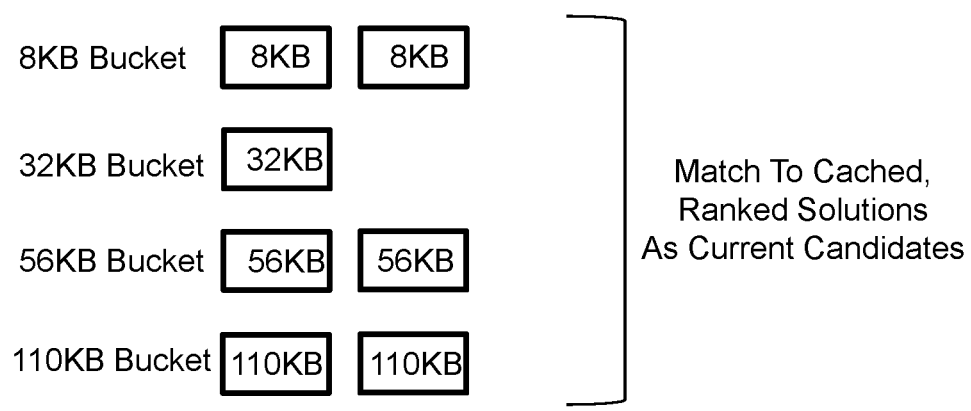

FIG. 6 illustrates preprocessing to facilitate matching of current packing candidates to cached, ranked greedy first fit packing solutions. A set of FE TRKs 360 is preprocessed to generate a set of bucketed FE TRKs. The FE TRKs are bucketed based on size and each size is represented by a separate bucket linked list data structure, which parallelizes the matching procedure. A match exists if the cached, ranked packing solution is a subset of the bucketed FE TRK candidates. Matching is attempted by making comparisons in ranked order from the most used solution to the least used solution. When a match is found, the matching packing solution is used for the matching current packing candidates using a new empty slice and the set of bucketed FE TRKs is updated by removing the packed FE TRKs from the corresponding buckets. The process is iterated, and matching is attempted again by making comparisons in ranked order from the most used solution to the least used solution with the remaining candidate bucketed FE TRKs.

Figure 7:
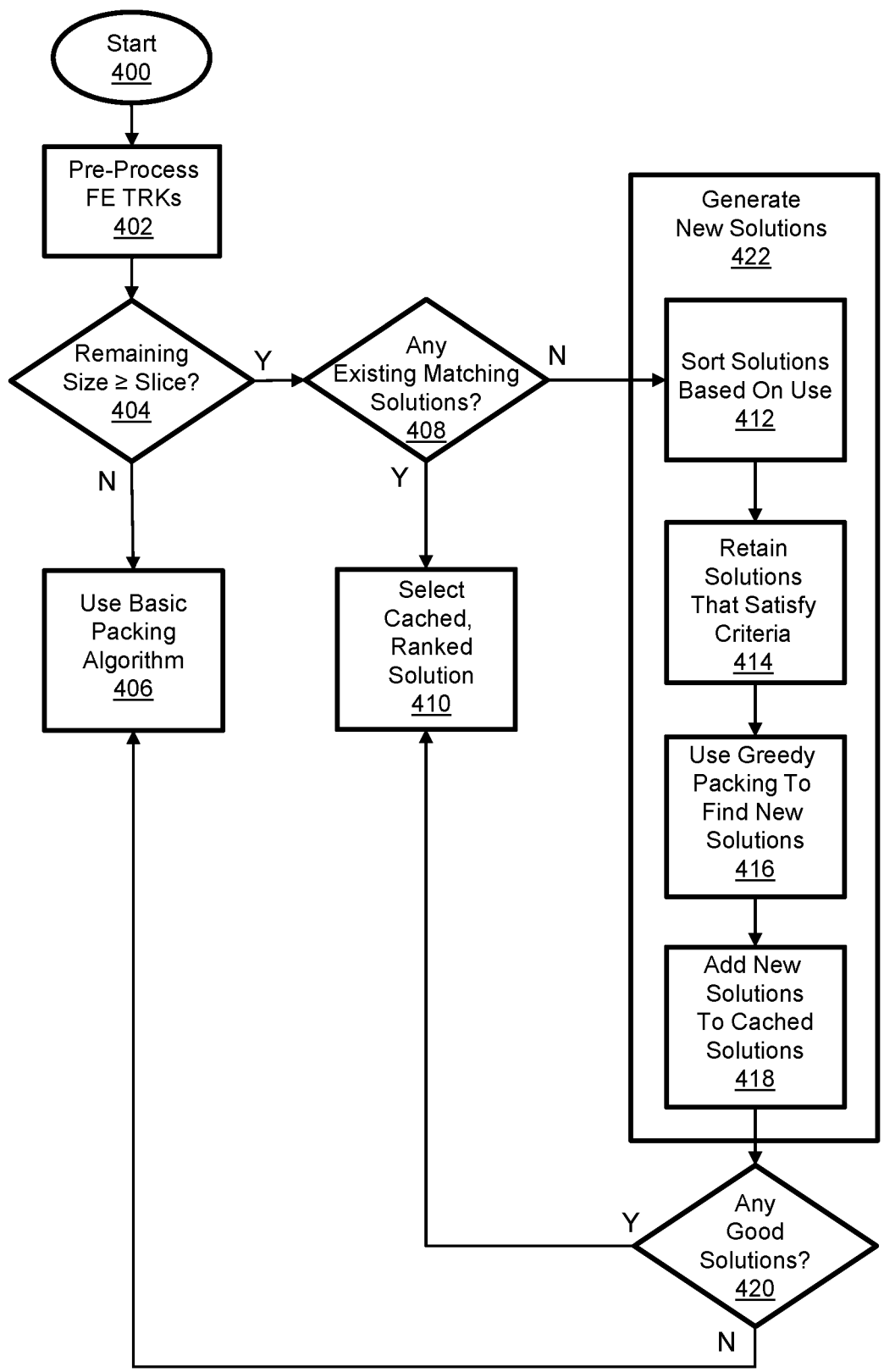
FIG. 7 illustrates steps associated with packing FE TRKs into a slice.

FIG. 7 illustrates steps associated with packing FE TRKs. Starting at 400, the FE TRKs to be relocated are preprocessed at step 402. As already described above, preprocessing includes sorting the FE TRKs into buckets based on size. Each bucket/size is represented by a separate linked list data structure. Step 404 is determining whether the aggregate size of the remaining bucketed FE TRKs is greater than or equal to the slice size. If the aggregate size of the remaining bucketed FE TRKs is not greater than or equal to the slice size, then the basic packing algorithm is used as indicated in step 406. The basic packing algorithm may select and pack the remaining bucketed FE TRKs in any order, e.g., randomly or by size. If the aggregate size of the remaining bucketed FE TRKs is greater than or equal to the slice size, then attempts are made to match the remaining bucketed FE TRKs with the cached packing solutions as indicated in step 408. In cases in which existing matching packing solutions are found in step 408 the highest ranking cached, ranked solution is selected and used as indicated in step 410.

In cases in which existing matching packing solutions are not found in step 408 a series of steps are performed to generate new solutions as indicated at 422. The existing solutions are resorted once every 100 seconds based on updated number of uses as indicated in step 412. Because usage trends may change the result of step 412 may be changes in the rankings of the cached packing solutions. Solutions that satisfy predetermined criteria may be retained as cached solutions indicated in step 414. Retention decision may be made based on rank or number of uses, e.g., relative to a predetermined threshold. Solutions that do not satisfy the criteria are discarded, e.g., removed from the cache. The greedy first fit packing algorithm is run to find new packing solutions using the remaining bucketed FE TRKs as indicated in step 416. The new packing solutions are added to the retained packing solutions as indicated in step 418. If any good solutions exist in the cached new solutions as determined at step 420 then the highest ranking new cached solution is selected and used as indicated in step 410. A good solution is a solution that packs a slice with no more than a predetermined gap of unused space. If no good solutions are found at step 420 then the basic packing algorithm is used as indicated in step 406.

Figure 8:
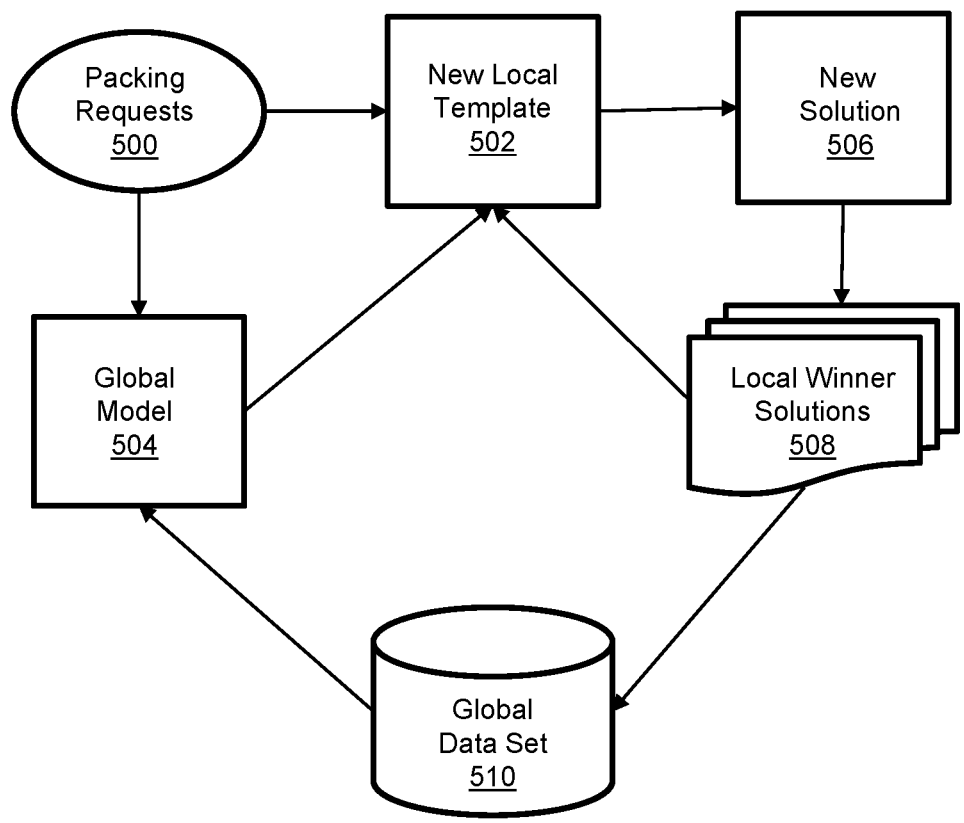
FIG. 8 illustrates creation and use of a global data set and model for packing with caching and ranking of packing solutions.

FIG. 8 illustrates creation and use of a global data set and model for greedy first fit packing with caching and ranking of packing solutions. Packing requests 500 are processed using both a local template 502 of cached packing solutions and a global model 504 of cached packing solutions from multiple boards, directors, storage arrays, or other units of organization. Results from use of the global model 504 may be used to update the local template, i.e., create a new local template. New solutions 506 are used to update a set of local winner solutions 508 that may also be used to update the local template 502. The local winner solutions 508 are stored in a global data set 510 that is used to generate the global model 504. Local and global inputs may be weighted. In this way packing solutions can be shared outside the domain in which they are discovered.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   in a data storage system comprising a plurality of non-volatile drives and a plurality of interconnected compute nodes that access the drives:
      the compute nodes presenting at least one logical production volume to hosts and managing access to the drives, wherein the hosts access the production volume using front-end tracks as allocation units, the compute nodes access the drives using back-end tracks as allocation units, and the drives are organized into same-size slices that are protection group members;
      the compute nodes packing front-end tracks into ones of the slices by:
         sorting the front-end tracks into buckets based on size;
         matching cached packing solutions with a subset of the sorted front-end tracks; and
         packing the subset of the sorted front-end tracks that match one of the cached packing solutions into a selected one of the slices.

2. The method of claim 1 comprising using a basic packing algorithm to pack remaining ones of the sorted front-end tracks in response to aggregate size of the remaining ones of the sorted front-end tracks being less than or equal to slice size.

3. The method of claim 2 comprising ranking the cached packing solutions based on number of times used to pack ones of the slices.

4. The method of claim 3 comprising attempting to match the subset of the sorted front-end tracks with the cached packing solutions in order by ranking.

5. The method of claim 1 comprising generating new packing solutions in response to failure to match any cached packing solutions with the subset of the sorted front-end tracks.

6. The method of claim 5 comprising retaining ones of the cached packing solutions that satisfy predetermined criteria and discarding ones of the cached packing solutions that fail to satisfy the predetermined criteria.

7. The method of claim 5 comprising generating the new packing solutions by running a greedy first fit algorithm.

8. An apparatus comprising:
   a data storage system comprising:
      a plurality of non-volatile drives; and
      a plurality of interconnected compute nodes that present at least one logical production volume to hosts and manage access to the drives, wherein the hosts access the production volume using front-end tracks as allocation units and the compute nodes access the drives using back-end tracks as allocation units and the compute nodes packing front-end tracks into ones of the slices by:
         sorting the front-end tracks into buckets based on size;
         matching cached packing solutions with a subset of the sorted front-end tracks; and
         packing the subset of the sorted front-end tracks that match one of the cached packing solutions into a selected one of the slices.

9. The apparatus of claim 8 wherein the compute nodes use a basic packing algorithm to pack remaining ones of the sorted front-end tracks in response to aggregate size of the remaining ones of the sorted front-end tracks being less than or equal to slice size.

10. The apparatus of claim 9 wherein the compute nodes rank the cached packing solutions based on number of times used to pack ones of the slices.

11. The apparatus of claim 10 wherein the compute nodes attempt to match the subset of the sorted front-end tracks with the cached packing solutions in order by ranking.

12. The apparatus of claim 8 wherein the compute nodes generate new packing solutions in response to failure to match any cached packing solutions with the subset of the sorted front-end tracks.

13. The apparatus of claim 12 wherein the compute nodes retain ones of the cached packing solutions that satisfy predetermined criteria and discarding ones of the cached packing solutions that fail to satisfy the predetermined criteria.

14. The apparatus of claim 12 wherein the compute nodes generate the new packing solutions by running a greedy first fit algorithm.

15. A computer-readable storage medium storing instructions that when executed by a computer cause the computer to perform a method for data packing, the method comprising:
   compute nodes presenting at least one logical production volume to hosts, wherein the hosts access the production volume using front-end tracks as allocation units and the compute nodes access the drives using back-end tracks as allocation units; and
   the compute nodes packing multiple front-end tracks into slices containing a plurality of back-end tracks by:
      sorting the front-end tracks into buckets based on size;
      matching cached packing solutions with a subset of the sorted front-end tracks; and
      packing the subset of the sorted front-end tracks that match one of the cached packing solutions into a selected one of the slices.

16. The computer-readable storage medium of claim 15 wherein the method further comprises using a basic packing algorithm to pack remaining ones of the sorted front-end tracks in response to aggregate size of the remaining ones of the sorted front-end tracks being less than or equal to slice size.

17. The computer-readable storage medium of claim 16 wherein the method further comprises ranking the cached packing solutions based on number of times used to pack ones of the slices.

18. The computer-readable storage medium of claim 17 wherein the method further comprises attempting to match the subset of the sorted front-end tracks with the cached packing solutions in order by ranking.

19. The computer-readable storage medium of claim 15 wherein the method further comprises running a greedy first fit algorithm to generate new packing solutions in response to failure to match any cached packing solutions with the subset of the sorted front-end tracks.

20. The computer-readable storage medium of claim 19 wherein the method further comprises retaining ones of the cached packing solutions that satisfy predetermined criteria and discarding ones of the cached packing solutions that fail to satisfy the predetermined criteria.

\* \* \* \* \*